United States Patent
Johnson et al.

(10) Patent No.: US 6,301,257 B1
(45) Date of Patent: *Oct. 9, 2001

(54) METHOD AND APPARATUS FOR TRANSMITTING DATA FRAMES BETWEEN SWITCHES IN A MESHED DATA NETWORK

(75) Inventors: Bobby Johnson, San Jose; Michael Yip, Cupertino; Earl Ferguson, Los Altos; Michael L. Goguen, Cupertino, all of CA (US)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/820,948

(22) Filed: Mar. 19, 1997

(51) Int. Cl.$^7$ ................................................. H04L 12/28
(52) U.S. Cl. ............................................... 370/406; 370/392
(58) Field of Search ..................... 370/400, 401, 370/402, 406, 409, 404, 351, 355, 254, 255, 386, 389, 397, 398, 396, 399, 390, 391, 392, 474, 432, 555, 410; 379/219, 220, 224, 225, 272; 395/200.33; 709/227, 238

(56) References Cited

U.S. PATENT DOCUMENTS

| | | | |
|---|---|---|---|
| 5,287,535 | * 2/1994 | Sakegawa | 370/392 |
| 5,408,469 | 4/1995 | Opher et al. | |
| 5,420,858 | * 5/1995 | Marshall et al. | 370/395 |
| 5,425,026 | * 6/1995 | Mori | 370/402 |
| 5,432,777 | * 7/1995 | Le Boudec | 370/392 |
| 5,440,547 | * 8/1995 | Easki | 370/392 |
| 5,473,603 | * 12/1995 | Iwata | 370/410 |
| 5,583,862 | * 12/1996 | Callon | 370/402 |
| 5,617,421 | * 4/1997 | Chin et al. | 370/410 |
| 5,737,334 | * 4/1998 | Prince et al. | 370/397 |
| 5,742,604 | * 4/1998 | Edsall | 370/401 |
| 5,774,662 | * 6/1998 | Sakagawa | 395/200.33 |
| 5,802,054 | * 9/1998 | Bellenger | 370/401 |
| 5,825,772 | * 10/1998 | Dobbins et al. | 370/396 |
| 6,055,561 | * 4/2000 | Feldman | 370/220 |

OTHER PUBLICATIONS

"LAN Emulation Over ATM Specification—Version1 1.0," ATM_FORUM, LAN Emulation SWG Drafting Group, pp. 1–139.

* cited by examiner

*Primary Examiner*—Wellington Chin
*Assistant Examiner*—Steven Nguyen
(74) *Attorney, Agent, or Firm*—Blakely Sokoloff Taylor & Zafman LLP

(57) ABSTRACT

In a data network, a source node transmits a data packet to a destination node across interconnected switches whereby a switch, upon receiving the data packet from the source node, queries other switches in the network for the appropriate switch and port on the switch out which to forward the data packet to the destination node. The appropriate switch responds to the query with its switch number and the port number of the port out which the data packet should be sent to reach the destination node. The querying switch caches the switch number and port number and prepends a destination tag to subsequent data packets it receives which are destined to the same destination node, thereby providing a distributed system among the switches in the network for maintaining detailed information regarding the appropriate switch and port out which to forward data packets received by a source node in the network.

23 Claims, 1 Drawing Sheet

METHOD AND APPARATUS FOR TRANSMITTING DATA FRAMES BETWEEN SWITCHES IN A MESHED DATA NETWORK

BACKGROUND OF THE INVENTION

1. Field of the Invention

The present invention is related to the field of data networks. In particular, the present invention is related to an improved method and apparatus for transmitting data frames between nodes connected to a meshed data network having permanently interconnected switches.

2. Description of the Related Art

Traditional data networks include the Ethernet/IEEE 802.3 Local Area Networks (LAN) and IEEE 802.5 Token Ring LAN. These LANs comprise a connectionless oriented shared medium over which unicast and broadcast packets are transmitted. In contrast, an Asynchronous Transfer Mode (ATM) network comprises a connection oriented packet switched network.

Communication between nodes (e.g., workstations, servers, bridges, etc.) on separate LANs interconnected via an ATM network or between a node on the ATM network and a node on the LAN wherein the ATM network and LAN are interconnected by, e.g., one or more switches, has been accomplished by emulating the LAN in the ATM network so that, from the perspective of the nodes, the ATM network is transparent. This service is known in the data networking industry as LAN Emulation (LE) service over ATM. LE service supports the interconnection of ATM networks and LANs using traditional bridging methods and allows interoperability between applications on nodes, whether the nodes are connected to an ATM network or LAN.

FIG. 1 provides an example of a data network 100 comprising, e.g., an IEEE 802.3 LAN 120 and 130 interconnected via an ATM network 110. Connected via segment 160 to the ATM network 110 is an ATM-based node 170. Respectively connected to LANs 120 and 130 are LAN-based nodes 140 and 150. With LE service, node 140 can communicate with node 170 or 150 utilizing the IEEE 802.2 LLC, network and transport layer protocols that it would otherwise use in a strictly LAN environment.

LE service is provided for by one or more LAN Emulation (LE) Clients (LECs) and a LAN Emulation (LE) service comprising an LE Configuration Server (LECS), LE Server (LES), and a Broadcast and Unknown Server (BUS). Generally speaking, the LECS assigns LE clients to a particular emulated LAN, while the LES registers and resolves MAC addresses or source route descriptors to ATM addresses, and the BUS handles multicast packets and unicast packets with an unknown destination address.

An LE Client is an ATM node such as a switch or node identified by one or more Media Access Control (MAC) addresses. The LE Service may be centralized or distributed across a number of devices such as an ATM node or switch. LECs communicate with the LES via control or data Virtual Circuit Connections (VCCs). The VCCs may be either Switched Virtual Circuits (SVCs) or Permanent Virtual Circuits (PVCs). For example, if the data network 100 of FIG. 2 supported LE service, switches 210 and 230 may well operate as LECs, while switch 220 may perform the function of the LES.

Communication between LECs and the LES is defined according to the LAN Emulation User to Network Interface (LUNI). LUNI provides for, among other things, initialization of LE Clients, registration of MAC addresses represented by the LECs, ATM to MAC Address Resolution Protocol (LE-ARP), and transferring data from an LE Client to another LE Client as part of the LE service.

A LEC has a separate VCC for transmission of control packets such as LE-ARP packets and for data packets such as IEEE 802.3 frames. Thus, at least one separate VCC exists between the LEC and each component of the LES, namely, the LECS, the LEC, and the BUS, and in fact, in some instances, two VCCs exist between the LEC and LES component. Given communication occurring between two nodes in the network 100, multiple control packets must be transmitted between the LEC and LES as well as the data packet(s) transmitted between the nodes. What is needed is a method and apparatus by which nodes in a network utilizing LE service may communicate more efficiently, without the need for transmission of multiple control packets between a LEC representing a particular node and the LES. Moreover, such method and apparatus may be applicable to any switched network environment.

BRIEF SUMMARY OF THE INVENTION

The present invention provides an improved method and apparatus by which nodes may transmit data packets over a fully meshed network topology of permanently interconnected switches. A source node may transmit a data packet to a destination node across interconnected switches whereby a switch, upon receiving the data packet from the source node, queries other switches in the network for the appropriate switch and port on the switch out which to forward the data packet to the destination node. The appropriate switch responds to the query with its switch number and the port number of the port out which the data packet should be sent to reach the destination node. The querying switch caches the switch number and port number and prepends such information in the form of a destination tag to subsequent data packets it receives which are destined to the same destination node, thereby providing a distributed system among the switches in the network for maintaining detailed information regarding the appropriate switch and port out which to forward data packets received by a source node in the network.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

Overview

The present invention provides an improved method and apparatus for transmitting data frames between nodes connected to a meshed data network having permanently interconnected switches. In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1:
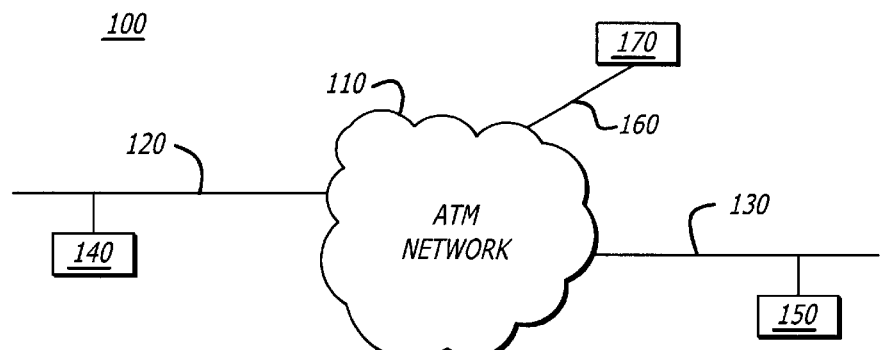
FIG. 1 is an illustration of an internetwork as may be utilized by the present invention.
Figure 2:
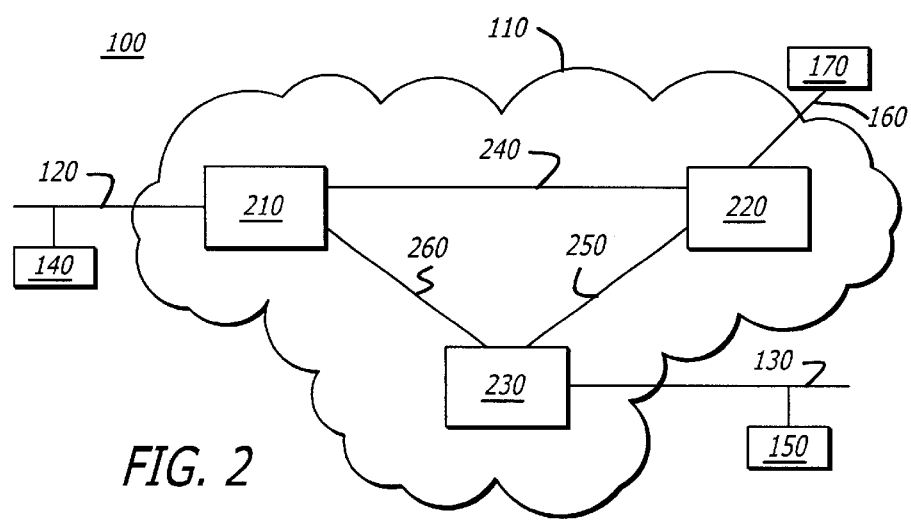
FIG. 2 is a further illustration of the internetwork as may be utilized by the present invention.

With reference to FIG. 2, a network is illustrated which obtains the benefit of the present invention. An ATM network 110 is comprised of three switches 210, 220 and 230 fully interconnected via permanent paths 240, 250 and 260. Connected to switch 220 is ATM node 170 via segment 160. Ethernet/IEEE 802.3 LAN 120 is connected to ATM network 110 via switch 210 and LAN 130 is likewise connected to ATM network 110 via switch 230. It can be appreciated that LANs 120 and 130 may be EEE 802.5 Token Ring LANs and that ATM network 110 may be another type of packet switched network, such as Frame Relay or X.25.

As will be seen, the preferred embodiment of the present invention addresses issues with respect to transmission of broadcast and multicast packets, address resolution request packets, and the forwarding of packets subsequent to address resolution. Two types of control packets are utilized: Permanent Virtual Circuit (PVC) packets and Address Resolution Protocol (ARP) packets. PVC packets are transmitted by switches 210, 220 and 230 to determine if the permanent virtual paths between the switches are operational. As will be explained, PVC packets utilize a broadcast destination tag. ARP packets, on the other hand, utilize a unicast destination tag.

Detailed Description

According to the present invention, a permanent virtual path exists between each switch in a fully meshed network having a plurality of interconnected switches. Each switch in the plurality of switches has one or more ports. Each switch, as well as each port is associated with an identifier, e.g., a number. Each switch maintains a table in internal memory associating the address, e.g., MAC address, of a node in the network with the switch number and port number of the switch "port out" which the node is reached. The switch and port number associated with a particular node is the destination tag (dtag) for such node.

Given that each switch maintains a table of such dtags, a switch is able to forward a data packet destined for a particular node, (a destination node) as determined by, e.g., the destination MAC address in the header of such data packet, not only to the appropriate switch, but to the appropriate port on the switch to which the node is connected, thereby saving the switch to which the node is connected from having to decode the data packet and determine, based on its own table of dtags, the appropriate port out which to forward the data packet to the destination node. Moreover, unlike the LES in an ATM network providing LE service, a distributed system such as utilized by the present invention for maintaining destination address resolution information provides fault tolerance by avoiding a single point of failure in the event a switch maintaining a central repository of address resolution information fails.

Entries in a switch's dtag table are learned and stored in the table upon the switch receiving a data packet having a destination address not already in the table. Upon such an occurrence, the switch queries all other switches in the network via a broadcast packet which specifies a dtag indicating that the packet is a broadcast packet. The appropriate switch responds to the query with the switch and port number of the switch/port to which the node having the destination address specified in the data packet is connected. The querying switch caches the switch and port number in a local dtag table in memory. Subsequent data packets received by the switch specifying the same destination address are modified by prepending the dtag to the data packet before forwarding the data packet to the appropriate port on the appropriate switch.

Figure 3:
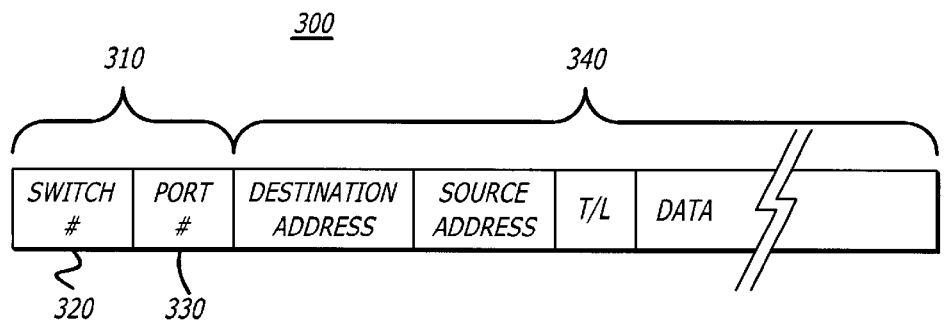
FIG. 3 is a packet format as may be embodied by the present invention.

As depicted in FIG. 3, the destination tag (dtag) may comprise a 2 byte header 310 prepended to a data packet 340, wherein the first (most significant) byte 320 is a switch number field specifying a switch number and the second (least significant) byte 330 is a port number field specifying a port number. It is appreciated that the dtag is scalable depending on the size of the network by increasing the length of either of the switch number field or port number field or both fields. The data packet 340 includes a destination address, a source address, a T/L field, and a data field.

Unlike traditional bridging methods, the present invention provides sufficient information for a switch to fully identify the port number of the next switch out which next switch will send the data packet that the next switch has received. for the next switch to perform a lookup operation in its own dtag or other address resolution table. The next switch receives the modified data packet, parses and strips the dtag before sending the data packet out the port identified by the dtag. Thus, it is appreciated that a fully meshed topology is needed for the present invention to take advantage of the information maintained by the first switch to receive and forward the data packet.

The present invention simplifies the process of forwarding a data packet as compared to the LE service in an ATM network. LE service requires transmitting a broadcast packet via a Broadcast and unknown server (BUS) to determine the appropriate switch to which to send a data packet, then initiating an LE-ARP via LES, which is a separate and second function utilizing additional and separate VCCs. Under the present invention, a broadcast packet (having a broadcast dtag) is broadcast to all switches using existing permanent virtual paths. No call set up is necessary since the present invention operates in a fully connected permanent mesh network topology. In contrast, wherein when a packet is transmitted by a first switch to a second switch using LE service, it is still necessary for the second switch to parse the packet and determine which port the packet should be forwarded to. LE Service does not resolve forwarding decisions down to the port level Instead, LE service generally operates according to switched or permanent virtual circuits at the switch level, which necessitates further packet processing at each switch according to traditional bridging methods.

In the preferred embodiment of the present invention, permanent virtual paths between each of the plurality of switches in the fully meshed network topology are verified by transmitting broadcast dtags prior to transmitting any data packets. Moreover, such broadcast dtags are transmitted at certain intervals to ensure the permanent virtual paths are up and operational and to provide a means by which flooding of broadcasts is achieved. Different broadcast dtags are associated with each permanent virtual path. For example, switch 210 transmits a broadcast to switch 220 with a dtag of 11(h), and transmits a broadcast to switch 230 with a dtag of 12(h).

The ARP control packet of the present invention differs from the PVC verification broadcast packet in that the PVC verification broadcast packet only specifies a broadcast dtag. The ARP control packet associates a specific dtag with a MAC address, thus, it is a unicast packet, not a broadcast packet. For example referring to FIG. 2, assume a packet destined for node 150 is received by switch 210 from node 140. If this is the first packet destined for node 150 received by switch 210, switch 210 does not know where to send the data packet because there is no entry in switch 210's dtag table for node 150. The switch then floods the data packet to all switches, e.g., switches 220 and 230. Furthermore, switch 210 initiates an ARP request by transmitting an ARP control packet to the other switches to determine the dtag for node 150. The appropriate switch, in this case, switch 230, responds, via an ARP response control packet, to the ARP request with its switch number (230) and port number of the port connected to LAN 130, over which node 150 is reachable. Switch 220 does not respond since it does not provide a direct path to node 150.

Subsequently, when another data packet is received by switch 210 destined for node 150, switch 210 checks its dtag table and knows where to send the packet; Not only does switch 210 know to send the data packet to switch (230), it also knows which port of switch 230 to send the data packet to. Switch 210 then prepends the dtag information to the data packet in the form of the dtag header illustrated in FIG. 3. Switch 230, upon receiving the data packet, reads the dtag, strips the dtag and sends the data packet out the port to which node 150 is connected via LAN 130. This can be done in hardware so the process occurs at wire speed.

What is claimed is:

1. In a network comprising a plurality of switches interconnected to form a meshed network topology for transmitting a data packet from a first node to a second node, a method comprising:
   receiving a data packet at a first switch coupled to the first node;
   in response to receiving the data packet, checking in a cache of the first switch for a destination tag, the destination tag identifying a second switch and a port of the second switch to which the second node is coupled; and
   if the destination tag is in the cache of the first switch, then prepending the destination tag to the data packet to form a modified data packet for transmission to the second switch.

2. The method of claim 1, further comprising:
   if the destination tag identifying the second switch and the port of the second switch to which the second node is connected is not in the cache of the first switch, then
   broadcasting the data packet from the first switch to the plurality of switches;
   transmitting a query packet from the first switch to the plurality of switches to determine the second switch and the port on the second switch to which the second node is connected in order to generate the destination tag;
   receiving from the second switch a response packet in response to the query packet specifying the second switch and the port of the second switch to which the second node is connected to generate the destination tag; and
   storing the destination tag in the cache of the first switch.

3. The method of claim 1 further comprising:
   transmitting the modified data packet from the first switch to the second switch identified by the destination tag;
   receiving the modified data packet at the second switch;
   parsing the destination tag prepended to the data packet from the modified data packet; and
   transmitting the data packet out the port identified by the destination tag.

4. The method of claim 3, further comprising:
   prior to transmitting the data packet out the port identified by the destination tag,
   stripping the destination tag prepended to the data packet.

5. The method of claim 1, wherein
   the destination tag comprises a switch number and a port number; and
   prepending the destination tag to the data packet comprises prepending the switch number and the port number to the data packet.

6. The method of claim 2 further comprising:
   receiving a second data packet at the first switch coupled to the first node;
   checking in the cache of the first switch coupled to the first node;
   checking in the cache of the first switch and finding the destination tag previously created associated with the first and second data packets; and
   prepending the destination tag to the second data packet to form a second modified data packet and transmitting the second modified data packet from the first switch to the second node.

7. The method of claim 2 further comprising:
   in response to the query packet,
   determining if a node is coupled to a port of a switch associated with the destination address of the broadcasted data packet.

8. The method of claim 7 further comprising:
   generating a response packet due to determining that the second node is coupled to a port of the second switch associated with the destination address of the broadcasted data packet, the response packet including the switch number and the port number coupled to the second node; and
   transmitting the response packet to the first switch.

9. An article of manufacture, comprising:
   a computer useable medium having computer readable program code embodied therein for transmitting a data packet received from a first node to a second node through a network comprising a plurality of switches interconnected to form a meshed network topology, the computer useable medium including,
   computer readable program code to receive the data packet at a first switch coupled to the first node;
   computer readable program code to check in a cache of the first switch for a destination tag in response to receiving the data packet, the destination tag identifying a second switch and a port of the second switch to which the second node is coupled; and if the destination tag is in the cache of the first switch, then computer readable program code to prepend the destination tag to the data packet to form a modified data packet.

10. The article of manufacture of claim 9, further comprising if the destination tag identifying the second switch and the port of the second switch to which the second node is coupled is not in the cache of the first switch:

computer readable program code to
i) broadcast the data packet from the first switch to the plurality of switches;
ii) transmit a query packet from the first switch to the plurality of switches to determine the second switch and the port of the second switch to which the second node is coupled;
iii) receive from the second switch a response packet in response to the query packet that specifies the destination tag identifying the second switch and the port of the second switch to which the second node is coupled; and
iv) store the destination tag in the cache of the first switch.

11. The article of manufacture of claim 9 further comprising:

computer readable program code to transmit the modified data packet from the first switch to the second switch identified by the destination tag;

computer readable program code to receive the modified data packet at the second switch;

computer readable program code to parse the destination tag prepended to the data packet from the modified data packet; and computer readable program code to transmit the data packet out the port identified by the destination tag.

12. The article of manufacture of claim 11, further comprising computer readable program code to strip the destination tag prepended to the data packet prior to transmitting the data packet out the port identified by the destination tag.

13. The article of manufacture of claim 9, wherein the destination tag comprises a switch number and a port number and wherein the computer readable program code to prepend the destination tag to the data packet includes computer readable program code to prepend the switch number and the port number to the data packet if the destination tag is in the cache.

14. The article of manufacture of claim 9 wherein the computer useable medium is one or more of the set of magnetic storage medium, optical storage medium, or semiconductor storage medium.

15. A method of transmitting data packets between a node of a first network to a node of a second network over a meshed network of switches, without decoding the data packets at every switch to determine the destination address, the method comprising:

maintaining a table of destination tags in each of the switches of the meshed network of switches, the table of destination tags identifying the switches and ports of the switches to which the nodes of the first and second networks are coupled;

prepending a destination tag to the data packets forming modified data packets, the destination tag associated with the destination of the data packets through the meshed network of switches; and transmitting the modified data packets through the meshed network of switches between the first and second networks in response to the destination tag.

16. The method of claim 15 for transmitting data packets, the method further comprising:

prior to prepending the destination tag to the data packets, receiving the data packets from the first or second network for transmission to the second or first network respectively.

17. The method of claim 15 for transmitting data packets, the method further comprising:

parsing the destination tag and the data packets from the modified data packets, transmitting the data packets to the first or second network in response to the destination tag.

18. The method of claim 15 for transmitting data packets, the method further comprising:

prior to maintaining the table of destination tags in each of the switches of the meshed network of switches, generating the table of destination tags in a switch of the meshed network of switches by transmitting broadcast type destination tags from the switch to each other switch in the meshed network of switches and receiving a response packet indicating the switch and port number of the switch to which the first or second network is coupled.

19. A computer data signal embodied in a bit stream between a node of a first network and a node of a second network in a meshed network of switches, the computer data signal comprising:

at least one byte indicating a switch number of a switch to which a node of the first or second network is coupled, and at least one byte indicating a port number of a port of the switch to which the node of the first or second network is coupled, the at least one byte indicating the switch number and the at least one byte indicating the port number preceding a data packet to form a modified data packet for communication over the meshed network of switches.

20. The computer data signal of claim 19 wherein the data packet includes a destination address and a source address of the data packet, and data.

21. The computer data signal of claim 19 wherein the at least one byte indicating a switch number and the at least one byte indicating a port number are a destination tag prepended to the data packet to form the modified data packet.

22. The computer data signal of claim 19 wherein the bit stream is communicated over network media.

23. The computer data signal of claim 22 wherein the network media is one of the set of cable, wireless carrier waves, and optical fiber.

* * * * *